(12) United States Patent
Yang et al.

(10) Patent No.: US 10,217,559 B2
(45) Date of Patent: Feb. 26, 2019

(54) MULTIPHASE COUPLED AND INTEGRATED INDUCTORS WITH PRINTED CIRCUIT BOARD (PBC) WINDINGS FOR POWER FACTOR CORRECTION (PFC) CONVERTERS

(71) Applicant: Virginia Tech Intellectual Properties, Inc., Blacksburg, VA (US)

(72) Inventors: Yuchen Yang, Blacksburg, VA (US); Mingkai Mu, Newark, CA (US); Fred C. Lee, Blacksburg, VA (US); Qiang Li, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 15/484,641

(22) Filed: Apr. 11, 2017

(65) Prior Publication Data

US 2017/0294833 A1    Oct. 12, 2017

Related U.S. Application Data

(60) Provisional application No. 62/321,250, filed on Apr. 12, 2016.

(51) Int. Cl.
*H02M 1/42*    (2007.01)
*H02M 1/084*   (2006.01)
(Continued)

(52) U.S. Cl.
CPC ...... *H01F 27/2804* (2013.01); *H02M 1/4225* (2013.01); *H02M 7/23* (2013.01); *H01F 2027/2809* (2013.01); *Y02B 70/126* (2013.01)

(58) Field of Classification Search
CPC . H02M 1/42; H02M 1/084; H01F 2027/2809; H01F 27/2804
(Continued)

(56) References Cited

U.S. PATENT DOCUMENTS

| | | | |
|---|---|---|---|
| 5,521,573 A * | 5/1996 | Inoh | H01F 27/2804 336/180 |
| 5,990,776 A * | 11/1999 | Jitaru | H01F 27/2804 336/200 |

(Continued)

*Primary Examiner* — Timothy J Dole
*Assistant Examiner* — Sisay G Tiku
(74) *Attorney, Agent, or Firm* — W & C IP

(57) ABSTRACT

A power factor correction (PFC) power converter, particularly of a multiphase totem-pole or other topology presenting a switching bridge that can potentially provide bi-directional power transfer control, reduces a nominal switching frequency and achieves zero voltage switching over an increased portion of a half line cycle by providing positive or inverse coupling of inductors in an inductor structure that can be formed of a multi-layer printed circuit board such that at least three different inductances are presented during each half line cycle period; allowing increased switching frequency and simplifying EMI filtering arrangements. Parasitic capacitances can be balanced with additional coupled windings to reduce differential mode and common mode noise. The PFC power converter is particularly applicable to provide bi-directional power control from an on-board battery charger in an electrically powered vehicle.

20 Claims, 20 Drawing Sheets

(51) Int. Cl.
*H01F 27/28* (2006.01)
*H02M 7/23* (2006.01)

(58) Field of Classification Search
USPC .............................. 336/212, 200, 220–222
See application file for complete search history.

(56) References Cited

U.S. PATENT DOCUMENTS

| | | | | |
|---|---|---|---|---|
| 6,281,779 | B1* | 8/2001 | Matsumoto | H01F 19/04 336/200 |
| 7,298,118 | B2* | 11/2007 | Chandrasekaran | H02M 3/1588 323/222 |
| 8,502,632 | B2* | 8/2013 | Suganuma | H01F 27/2804 336/200 |
| 9,431,896 | B2* | 8/2016 | Ye | H02M 1/4208 |
| 9,628,043 | B2* | 4/2017 | Meyer | H01F 19/04 |
| 2006/0038650 | A1* | 2/2006 | Mehrotra | H01F 27/2804 336/83 |
| 2008/0054874 | A1* | 3/2008 | Chandrasekaran | H01F 37/00 323/362 |
| 2008/0094153 | A1* | 4/2008 | Wang | H01F 17/062 333/177 |
| 2010/0067263 | A1* | 3/2010 | Qian | H02M 3/285 363/21.12 |
| 2010/0254168 | A1* | 10/2010 | Chandrasekaran | H01F 3/10 363/37 |
| 2012/0249280 | A1* | 10/2012 | Nussbaum | H01F 27/2804 336/192 |
| 2014/0085757 | A1* | 3/2014 | Fornage | H02H 1/04 361/18 |
| 2014/0119070 | A1* | 5/2014 | Jeong | H02M 1/4225 363/45 |
| 2015/0180330 | A1* | 6/2015 | Ye | H02M 1/4208 363/126 |
| 2016/0254090 | A1* | 9/2016 | Lloyd | H01F 27/2804 336/200 |
| 2016/0254091 | A1* | 9/2016 | Harber | H01F 27/266 336/221 |
| 2016/0294296 | A1* | 10/2016 | Lee | H02M 1/4258 |
| 2016/0336106 | A1* | 11/2016 | Chung | H01F 27/2804 |
| 2018/0261378 | A1* | 9/2018 | Yamaguchi | H02M 3/33576 |

* cited by examiner

MULTIPHASE COUPLED AND INTEGRATED INDUCTORS WITH PRINTED CIRCUIT BOARD (PBC) WINDINGS FOR POWER FACTOR CORRECTION (PFC) CONVERTERS

CROSS-REFERENCE TO RELATED APPLICATIONS

This application claims benefit of priority of U.S. Provisional Application 62/321,250, filed Apr. 12, 2016, which is hereby incorporated by reference in its entirety.

FIELD OF THE INVENTION

The present invention generally relates to high-efficiency direct and inverse coupled multiphase inductor structures suitable for being fabricated with printed circuit board (PCB) windings, particularly for use in high power density power factor correction (PFC) power converters and which reduce or eliminate common mode (CM) noise reflection to the power source.

BACKGROUND OF THE INVENTION

A power factor correction (PFC) converter is an essential component of power converter structures that derive power from an alternating current (AC) source such as the power distribution network or grid. The power factor correction function serves to prevent phase changes due to variation in load current from being reflected to the AC source and to maintain high efficiency by insuring that power is transferred to a load substantially in phase with the instantaneous voltage provided by the AC power source. This function is generally accomplished by switching that is varied in frequency and/or duty cycle with the magnitude of the voltage provided by the AC power source.

There are several trade-offs in the design of physical PFC converters, particularly in regard to efficiency, filtering of switching noise and power density (e.g. the amount of power that can be provided to a load per unit of volume of the PFC converter). In general, a nominal (or minimum) operating frequency is chosen to be in a range below several hundred KHz. At such switching frequencies, the PFC converter component requires about one-third of the volume of an AC/DC converting power supply for the necessary switches, EMI switching noise filter, inductors and filter capacitor to provide power factor correction. Increasing the switching frequency can reduce the volume of a PFC converter and raise the corner frequency of the EMI filter and PFC converter to reduce overall power converter size. However, increased switching frequency substantially increases switching power losses, particularly due to the high turn-on losses for cascade gallium nitride (GaN) devices currently preferred for high power applications. Such high turn-on losses can be overcome by a critical conduction control method (CRM) in which switches are controlled to draw power from a source when inductor current reaches zero and turned off a fixed time later which is preferred for that reason and referred to as constant on-time (COT) control. Additionally, losses due to reverse recovery of the power diode in a CRM boost PFC converter may be reduced through use of zero current switching (ZCS). Higher possible power factor and reduced peak inductor current are other advantages that can be obtained from a CRM boost PFC converter. Unfortunately, the topology of a boost PFC converter is complex and, hence, more expensive to produce than other PFC converter topologies.

For example, a so-called totem-pole PFC converter is far simpler than a boost converter or other bridgeless PFC converter topologies. While totem-pole topologies were not practical in the past due to the reverse recovery performance of the body diodes of switches included therein, that problem is ameliorated with GaN switches currently available; increasing interest in this simplified topology. However, several intractable problems with the totem-pole PFC converter topology remain: large frequency excursions during half-cycles of the input line frequency AC voltage and the inability to achieve zero voltage switching over the entirety of an input voltage half-cycle; both of which engender large losses and limit efficiency.

The concept of using coupled inductors has been widely applied in multiphase voltage regulator modules (VRMs, as distinct from PFC converters) to limit losses and improve transient response. The concept of coupled inductors has also been evaluated in interleaved CRM boost PFC converters. However, no solution to the frequency excursion and problems in achieving ZVS switching in totem-pole PFC converters have been previously found. Additionally, in interleaved multiphase PFC converters with coupled inductors, the input current ripple, which has an impact on differential mode (DM) noise, is determined by the leakage inductance of the coupled inductor and, since the leakage inductance is smaller than the leakage inductance of the non-coupled inductors, the DM noise will be larger. Reduction of common mode (CM) noise by balancing techniques in some types of power converters is also known. However, it is not known if balancing techniques can be applied to reduce or eliminate CM noise problems in totem-pole PFC converters or if suitable balancing techniques are consistent with compact coupled inductor structures, especially of the PCB winding type.

SUMMARY OF THE INVENTION

It is therefore an object of the present invention to provide a an interleaved multiphase totem pole PFC converter capable of reducing non-ZVS losses and reducing average switching frequency with corresponding reduction in switching losses.

It is another object of the invention to provide a simplified PFC converter of reduced complexity and cost which reduces non-ZVS switching losses and provides reduction in bot DM and CM noise.

It is a further object of the invention to provide a compact, light weight bi-directional power converter particularly suitable for charging batteries and controlling propulsion power for electrically powered vehicles.

It is yet another object of the present invention to provide a compact, integrated coupled inductor structure suitable for use in a totem-pole PFC converter with either direct or inverse coupling and having PCB windings.

In order to accomplish these and other objects of the invention, a power converter is provided including a plurality of switches wherein the switches are controlled in a manner to provide a switching cycle, and an inductor structure including at least two inductors wherein the at least two inductors are magnetically coupled with each other to present at least three different equivalent inductance values during the switching cycle and wherein windings of each of the at least two inductors are formed of printed circuit board layers which are interleaved to provide at least one layer of each winding among layers of another of the at least two windings.

In accordance with another aspect of the invention, an inductor structure is provided including at least two inductors wherein the at least two inductors are magnetically coupled with each other to present at least three different equivalent inductance values during a switching cycle and wherein windings of each of the at least two inductors are formed of printed circuit board layers which are interleaved to provide at least one layer of each winding among layers of another of the at least two windings.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
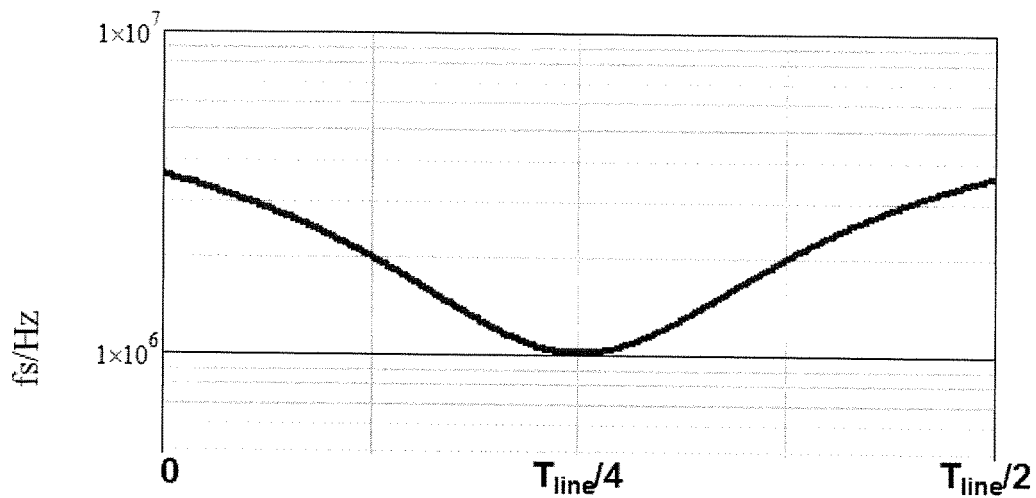
FIG. 1 is a graph of switching frequency variation over a one-half cycle time of a line frequency AC input voltage (half line cycle)

Referring now to the drawings, and more particularly to FIG. 1, there is shown a graph of the switching frequency of a CRM totem-pole PFC converter over a half line cycle of input voltage. The operating principle of CRM PFC converters, regardless of converter topology, is well-known. Ideally, when a switch is closed to draw power from the input power source, the inductor current will increase substantially linearly. When the switch is turned off, for example, after a fixed time period in a so-called constant on-time (COT) mode of operation, the inductor current will decrease substantially linearly. When the inductor current reaches zero, the switch is again turned on and the switching cycle is repeated. Thus, the inductor current will ideally be a series of triangular waves with a variable maximum current given by $$i_{pk} = (V_{in}/L) * T_{on} \quad (1)$$

which varies with the sinusoidal variation of input voltage and a minimum current of zero. Due to the substantial linearity of the increase and decrease of inductor current, the period of each triangular inductor current waveform also varies sinusoidally, resulting in a sinusoidal variation in switching frequency over a half line cycle. That is, as long as $T_{on}$ is fixed, the peak current follows $V_{in}$ and the resulting variation in switching frequency at any instant during a half line cycle can be calculated as $$f_s(t) = \frac{V_{in_{RMS}}^2 (V_O - \sqrt{2} V_{in_{RMS}} \sin(\omega t))}{2LP_O V_O} \quad (2)$$

Where $P_O$ is the output power.

The minimum switching frequency can be set at any desired value based on the design trade-offs alluded to above. However, from FIG. 1 it can be seen that if the minimum frequency is set at 1 MHZ, the switching frequency can increase into the range of 2-3 MHZ, increasing switching losses.

Figure 2:
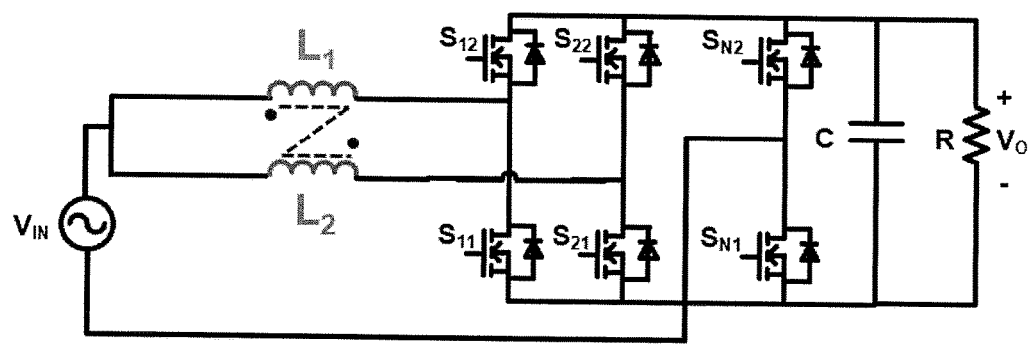
FIG. 2 is a schematic diagram of an interleaved totem-pole PFC circuit with a coupled inductor.
Figure 2A:
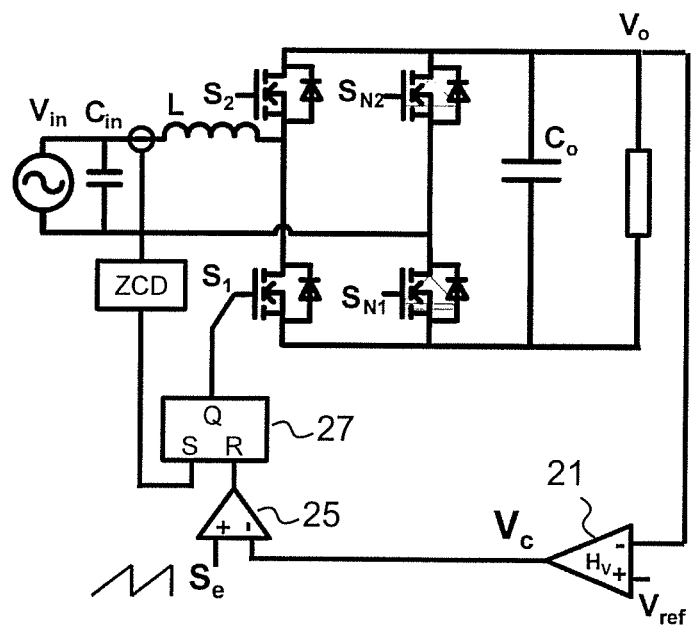
FIG. 2A is a schematic diagram of a single phase totem-pole power converter useful for understanding the operation of FIG. 2, FIGS. 2B, 2C, 2D, 2E and 2F are waveforms useful for understanding the operation of FIGS. 2 and 2A, FIGS. 3A and 3B illustrate inductor current waveforms at different duty cycles, D, for the circuit of FIG. 2.
Figure 2B:
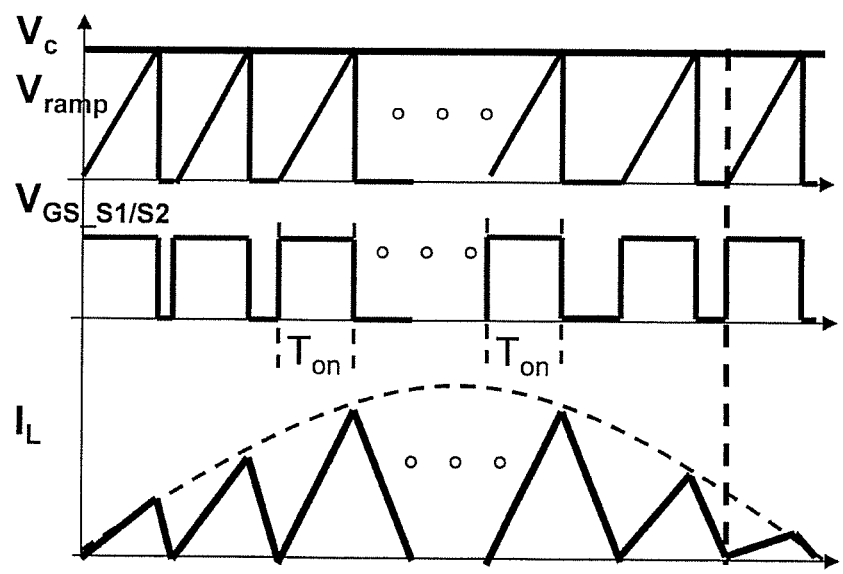

Referring now to FIGS. 2, 2A and 2B, a schematic diagram of a two-phase interleaved totem-pole PFC converter in accordance with the invention is shown in FIG. 2. A single phase totem-pole configuration without the coupled inductor, as illustrated in FIG. 2A with an exemplary COT control arrangement (omitted from FIG. 2 for clarity), is known. A totem-pole configuration is similar to the topology of a boost converter with one series-connected pair (e.g. $S_1$, $S_2$) of switches operated in a complementary fashion at high frequency for each phase and a second pair of series-connected switches, $S_{N1}$, $S_{N2}$, also operated in a complementary fashion but having a switching cycle synchronized with the AC input voltage (e.g. line frequency). Therefore the two-phase totem-pole topology will have two high-frequency switch pairs as shown in FIG. 2. Basically, in operation, the output voltage, $V_o$, is compared with a reference voltage $V_{ref}$ at comparator 21 to produce a near constant control voltage, $V_c$, which is compared with a constant slope ($S_e$) ramp waveform which is reset when the ramp voltage reaches $V_c$, as shown in FIG. 2B. The comparison of a constant slope external ramp signal, $S_e$, with a substantially constant control voltage $V_c$ at comparator 25 is used to reset flip-flop 27 together with setting flip-flop 27 at an inductor current of zero detected at zero current detector, ZCD, yields a rectangular pulse train of substantially constant duration pulses as shown at waveform $V_{GS}$ of FIG. 2B but which varies in frequency (inversely) with the input voltage as shown in FIG. 1 and in greater detail in FIG. 2B since $i_L$ is a series of triangular waveforms which varies in amplitude and duration with the amplitude of the sinusoidally varying input voltage.

Figure 2C:
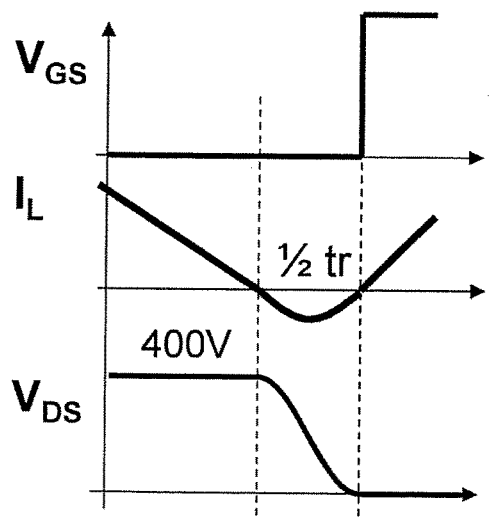

As alluded to above, known CRM interleaved totem-pole PFC converters cannot achieve ZVS over the entire half line cycle. When inductor current drops to zero, the switch cannot become conductive until the drain-source junction capacitance is discharged and the inductor will resonate with the junction capacitors of the switches as illustrated in detail in FIG. 2C where $i_L$ briefly drops below zero.

Figure 2D:
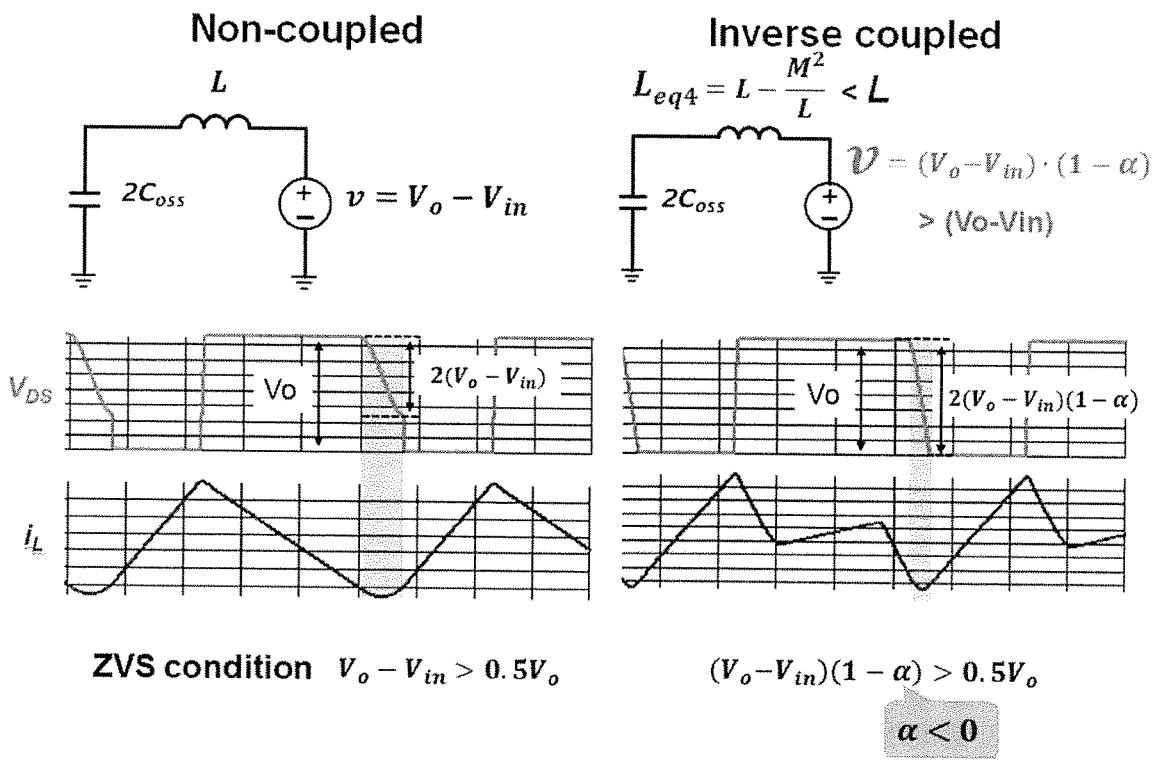

The peak-to-peak oscillation voltage amplitude of the device junction capacitance, $V_{DS}$, is therefore $2(V_o-V_{in})$ as shown in the waveform for non-coupled inductors on the left side of FIG. 2D. The inductor current, $I_L$, will be negative during the resonant discharge period before the switch can again become conductive. Therefore, when the input voltage is larger than $0.5V_o$, the switch can only achieve valley switching instead of ZVS. Conversely, when the input voltage is less than $0.5V_o$, the voltage oscillation amplitude is larger than $V_o$ and causes additional circulating energy during the resonant period. When it is considered that the input voltage is fluctuating at the line frequency, either non-ZVS losses or losses due to additional circulating energy will be present during virtually all of the half-line cycle (e.g. when $V_{in} \neq V_0$).

Figure 2E:
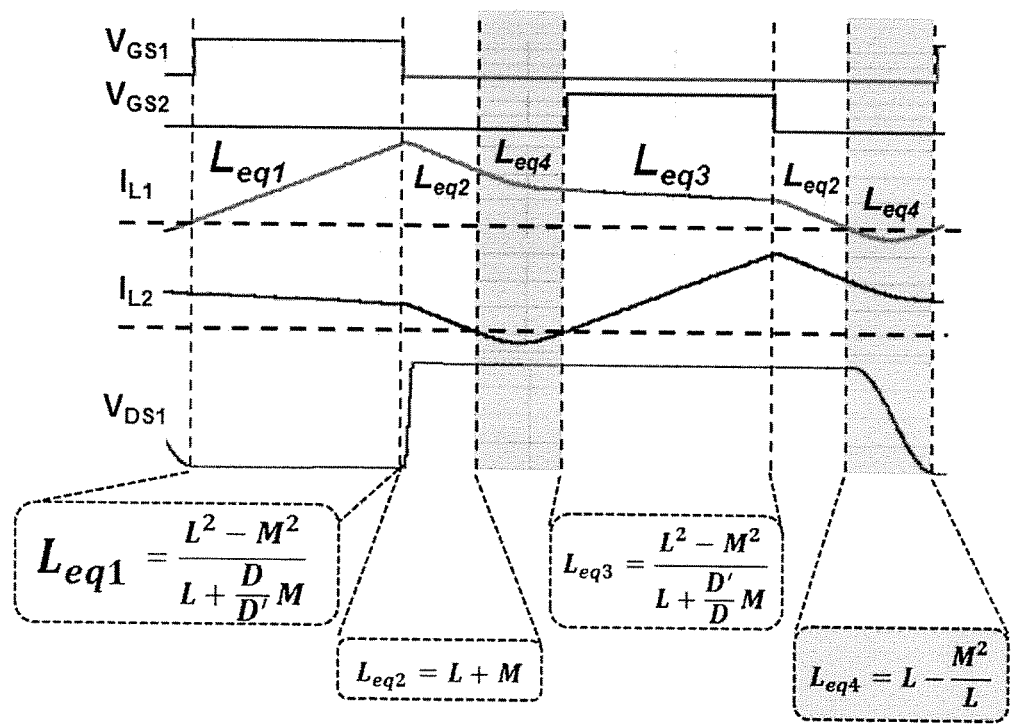
Figure 2F:
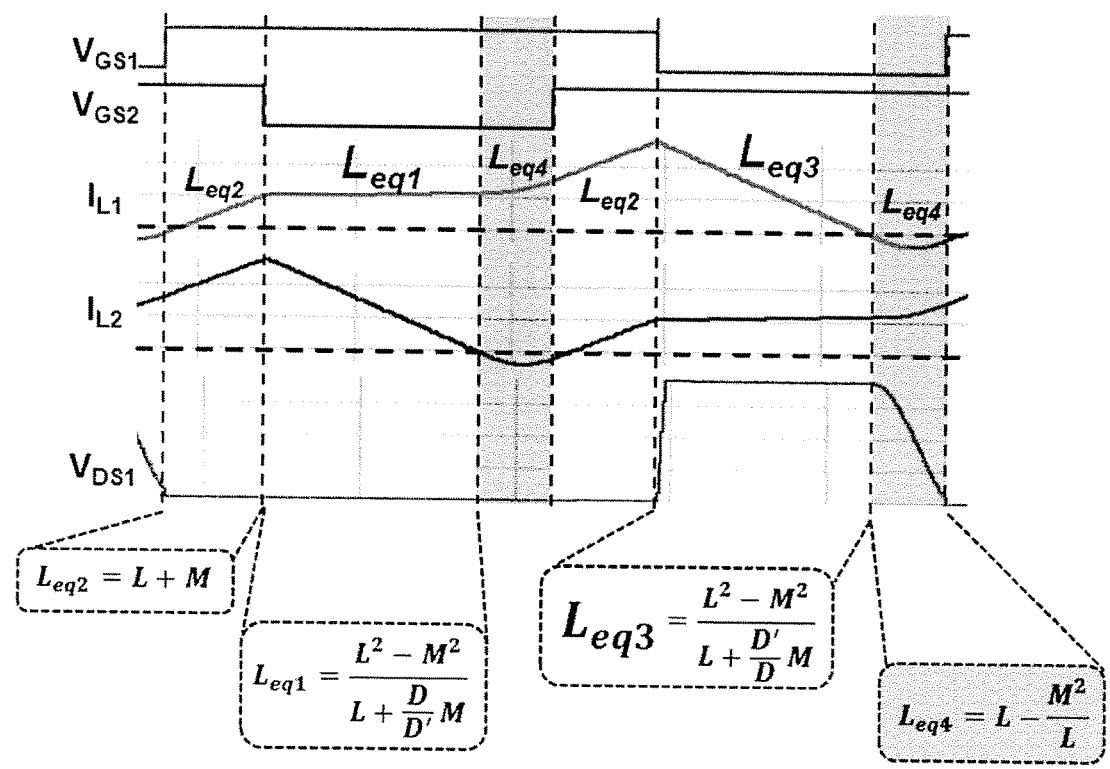
Figure 3A:
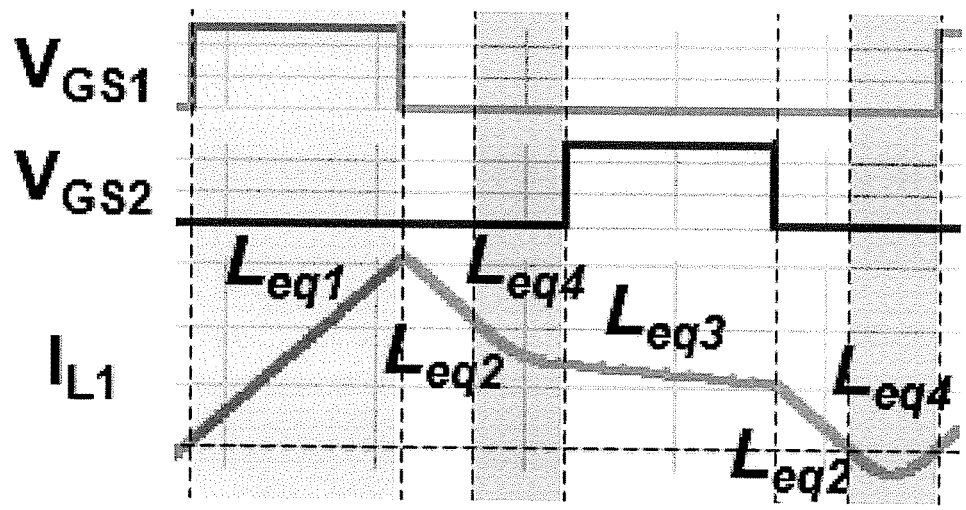
Figure 3B:
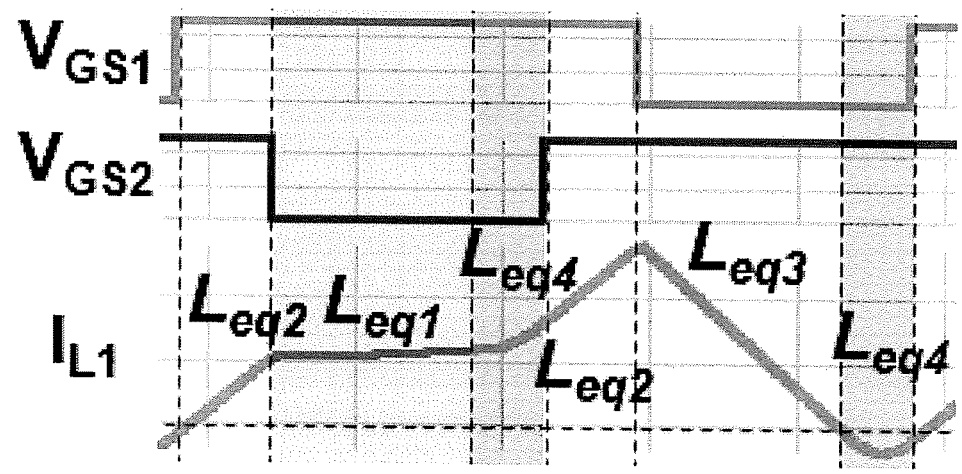

However, if inverse coupling of the inductors of the respective phases is provided in accordance with the invention, as illustrated in FIG. 2, inductor current waveforms such as those illustrated for differing duty cycles in FIGS. 3A and 3B for inductor $L_1$ will be produced. The waveform for inductor $L_2$ will be the same as that of $L_1$ but with a 180° phase shift referenced to the line frequency as shown in FIGS. 2E and 2F. (A comparison of waveforms for non-coupled and coupled inductors is shown in FIG. 2D.) It is apparent from the differing slopes of the current waveform during portions of the switching cycle that the coupled inductors exhibit different equivalent inductances during different portions of a switching cycle. These differing equivalent inductances may be expressed as:

$$L_{eq1}=(L^2-M^2)/(L+(D/D')M)$$

$$L_{eq2}=L+M$$

$$L_{eq3}=(L^2-M^2)/(L+(D'/D)M)$$

$$L_{eq4}=L-M^2/L \qquad (3)$$

where $D'=1-D$ and M is the mutual inductance of the coupled inductors.

Figure 4:
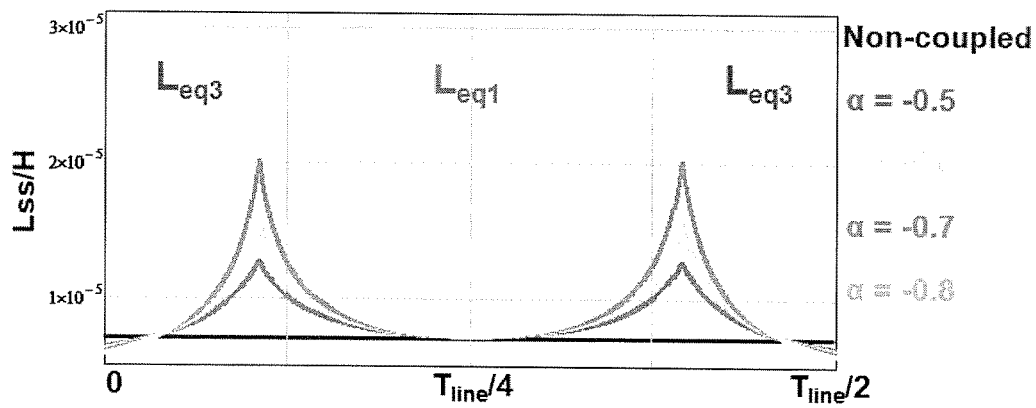
FIG. 4 is a graph of steady-state inductance value variance over a half line cycle of an AC input voltage over a range of coupling coefficients.
Figure 5:
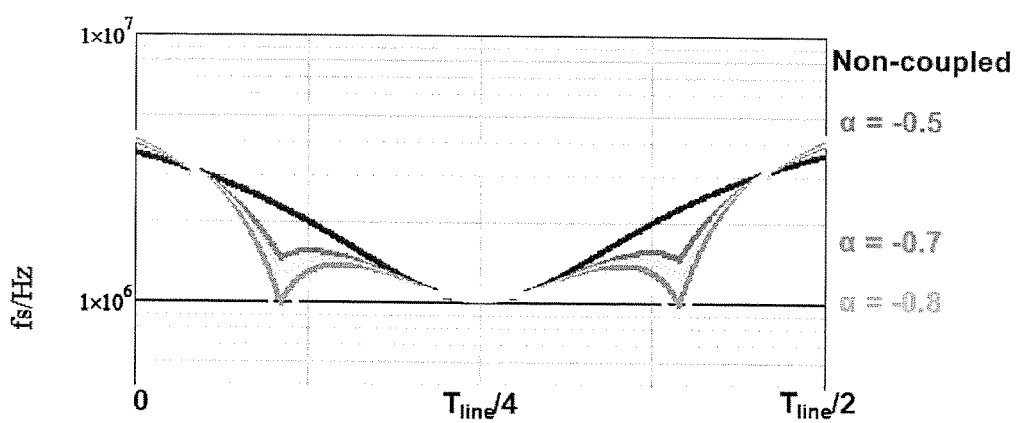
FIG. 5 is a graph of switching frequency variance over a half line cycle of an AC input voltage over a range of coupling coefficients.

When the input voltage is high, the duty cycle, D, is less than 0.5 and $L_{eq1}$ determines the current ripple of the phase. When the input voltage is low, the duty cycle, D, is greater than 0.5 and $L_{eq3}$ determines the current ripple of the phase. Thus it is seen that the steady state inductance of the coupled inductors is changing with the voltage during a half line cycle as shown in FIG. 4 from which it is evident that coupling of the inductors increases inductance when the duty cycle approaches 0.5 compared with non-coupled inductors having the same inductance. Accordingly, the on-time must also change during the half line cycle to maintain unity power factor. Thus the switching frequency will also change during the half line cycle period in a manner different from the case of non-coupled inductors and be sharply reduced as duty cycle approaches 0.5, as shown in FIG. 5.

$L_{eq2}$ is simply the leakage inductance of the coupled inductors. However, $L_{eq4}$ is the equivalent inductance during the resonant period and is necessarily less than the inductance of the non-coupled inductor in accordance with the above equation. Therefore the resonant period is shortened in comparison with the non-coupled converter as also shown in FIG. 2D and results in a relatively longer portion of energy transfer time and reduced conduction loss.

Further in regard to FIG. 2D, the equivalent circuits for the resonant periods of the non-coupled and coupled inductors when the inductors are resonating with the steady state switch capacitors, are schematically illustrated in the upper portion of the Figure. At the beginning of the resonant period, $V_{DS}$ starts to drop from $V_o$. Since the resonant amplitude is $2(V_o-V_{in})$ for the converter with non-coupled inductors. If this amplitude is smaller than $V_o$, $V_{DS}$ cannot reach a zero value and only resonates to a valley voltage in the waveform. Thus ZVS can only be achieved with non-coupled inductors when $(V_o-V_{in})>0.5$ $V_o$. Thus, for the converter with coupled inductors presenting a smaller inductance during the resonant period of $L_{eq4}=L-M^2/L$, the resonant amplitude is $(V_o-V_{in})*(1-\alpha)>(V_o-V_{in})$ because $\alpha<0$ and $V_{DS}$ can reach zero and ZVS can be achieved for a significantly larger range of $V_{in}$.

Thus it is seen that the coupled inductor can assist in achieving ZVS when the input voltage is higher than $0.5$ $V_o$ when the duty cycle is small and can reduce non-ZVS losses by as much as 50%. Conversely, the reduction in circulating energy and reduction in duration of resonance when the input voltage is less than $0.5$ $V_o$ and the duty cycle is large can substantially reduce conduction losses.

Figure 6A:
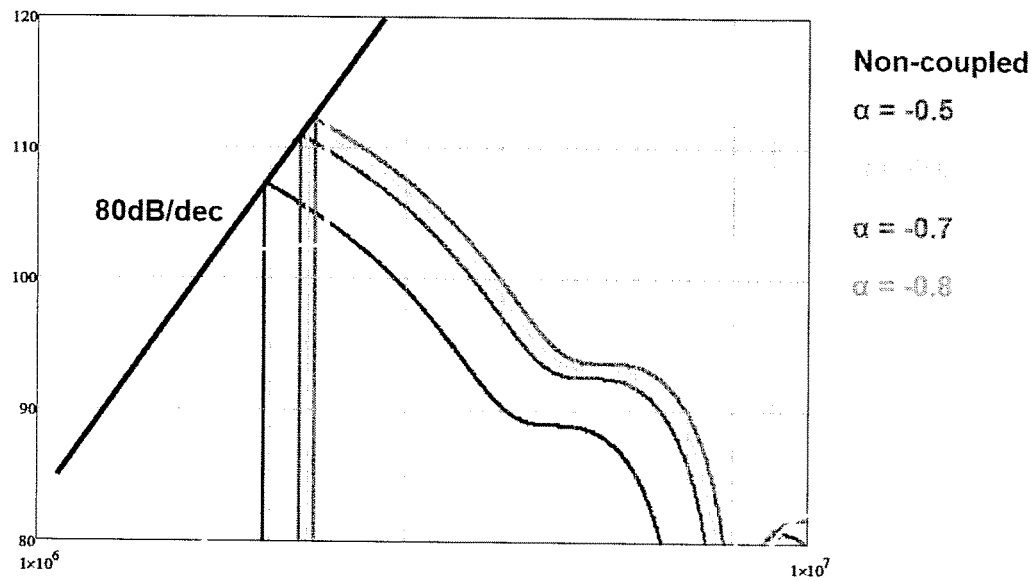
FIGS. 6A and 6B are graphs of calculated DM noise and preferred switching frequency variation, respectively over a range of coupling coefficients.
Figure 6B:
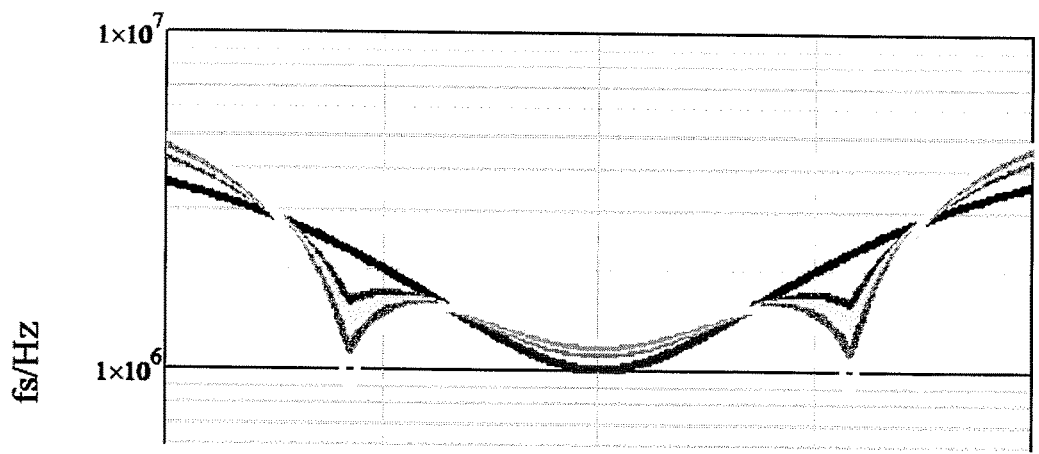

In an interleaved totem-pole PFC converter, the input current ripple is determined by $L_{eq2}$. The input current ripple will impact the differential mode (DM) noise of the PFC converter. Since $L_{eq2}$ is necessarily larger than the inductance of the non-coupled inductor, the DM noise is necessarily reduced in comparison; allowing the switching frequency to be slightly raised in the central region as shown in FIG. 6B without alteration of the filter configuration or characteristic (e.g. 80 dB/decade) as shown in FIG. 6A which is a plot of DM noise as a function of frequency for the converter with non-coupled inductors and coupled inductors for a plurality of coupling factors. As can be observed, DM (and CM noise increases slightly with increasing coupling factor. However, it can be seen from FIG. 6B that other than the small central region and the small regions at the ends of the half line cycle period, the switching frequency is very much reduced compared with the non-coupled case; significantly reducing average switching frequency and further reducing switching losses while not complicating DM noise filtering arrangements.

Figure 7:
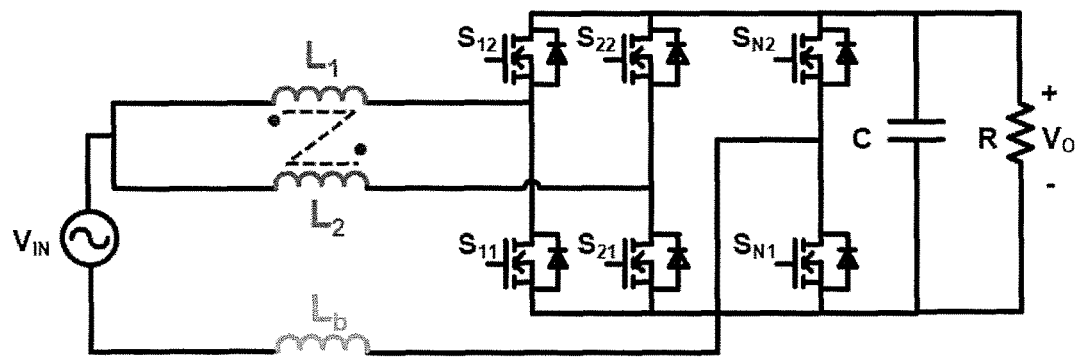
FIG. 7 is a schematic diagram of the circuit of FIG. 2 with a balancing technique applied.
Figure 8A:
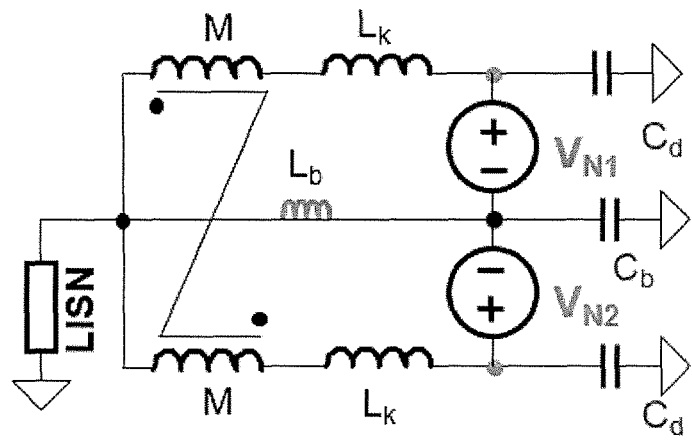
FIGS. 8A and 8B are schematic diagrams of a CM noise model and a CM noise model for either of the voltage sources of the model of FIG. 8A, respectively.
Figure 8B:
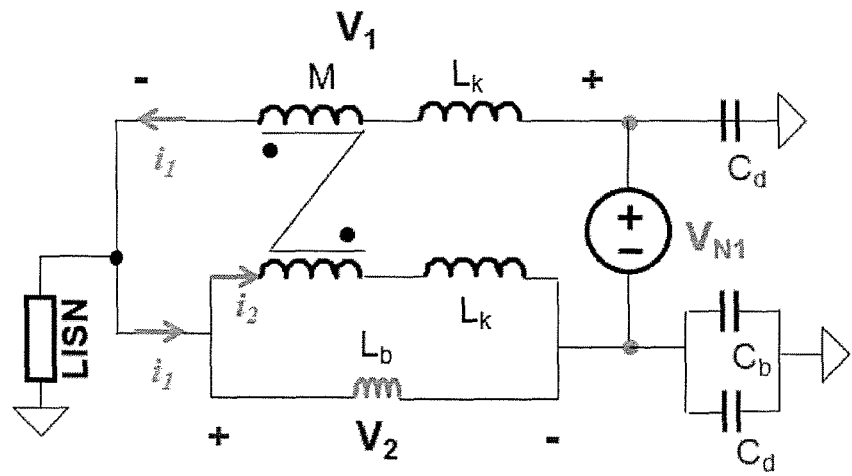

A balancing technique has been used to reduce or substantially eliminate common mode (CM) noise in an interleaved boost PFC converter. The inventors have found that such a balancing technique can also be applied to as totem-pole PFC converter with a coupled inductor. Referring now to FIG. 7, an extra inductor can be added to the circuit shown in FIG. 2 to achieve balance. The CM noise model is shown in FIG. 8A. The slew rates (dv/dt) of the active devices/switches are the dominant sources of CM noise and are modeled in FIG. 8A as separate noise sources, $V_{N1}$ and $V_{N2}$. Under superposition theory, the effect of each CM noise source can be analyzed independently of the other as shown in FIG. 8B including only noise source $V_{N1}$. Cb is the parasitic capacitance between the output terminal and ground. Cd is the drain to ground capacitance of the switches. The balance condition is $$Za/Zb = (Cd+Cb)/Cd. \quad (4)$$

In order to balance this equation, Za/Zb must first be calculated. From the circuit of FIG. 8B the following equations can be obtained:

$$\begin{cases} V_1 = \frac{di_1}{dt}L_k + \frac{d(i_1+i_2)}{dt}M \\ V_2 = \frac{di_2}{dt}L_k + \frac{d(i_1+i_2)}{dt}M \\ V_2 = \frac{d(i_1-i_2)}{dt}L_b \end{cases} \quad (5)$$

The ratio of Za/Zb can thus be derived from equation (5) as $$Za/Zb = (V1/i1)/(V2/i1) = (L_k+L_b/L_b. \quad (6)$$

Thus the balance equation can be derived as $$L_k/L_b = Cb/Cd. \quad (7)$$

Figure 9A:
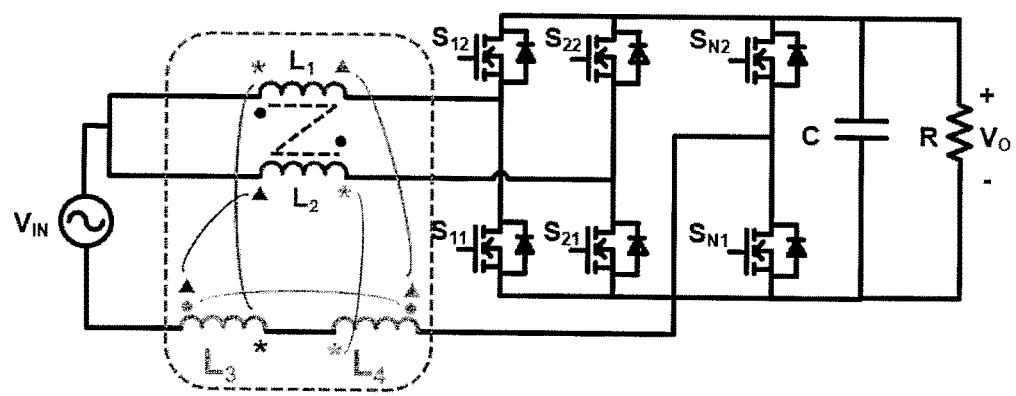
FIG. 9A is a schematic diagram of an improved and preferred balance technique of the circuit of FIG. 7, FIG. 9B in a model of a magnetic structure suitable for use in the circuit of FIG. 9A, FIGS. 10A and 10B are schematic diagrams of a CM noise model and a CM noise model for either of the voltage sources of the model of FIG. 8A, respectively, employing the magnetic circuit of FIGS. 9A and 9B.

The same analysis can be performed for $V_{N2}$, yielding another balance inductor as shown in FIG. 9A in which the balance inductors are labeled $L_3$ and $L_4$. It should be noted that the CM noise is not impacted by the mutual inductance.

Figure 9B:
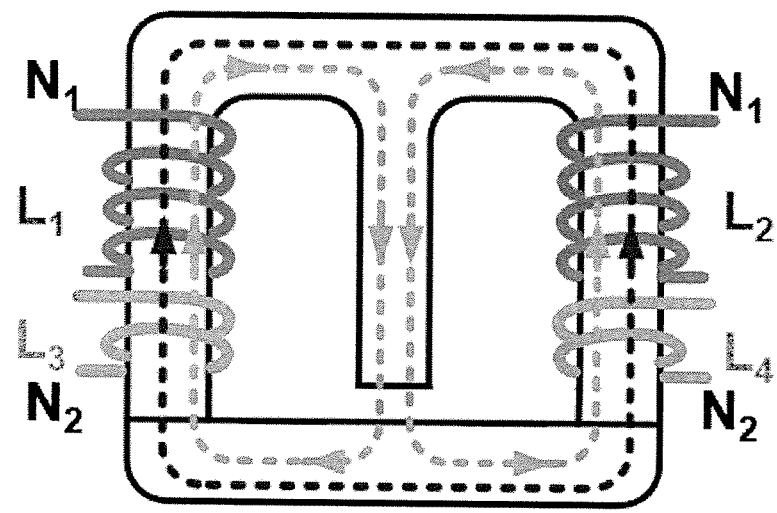
Figure 10A:
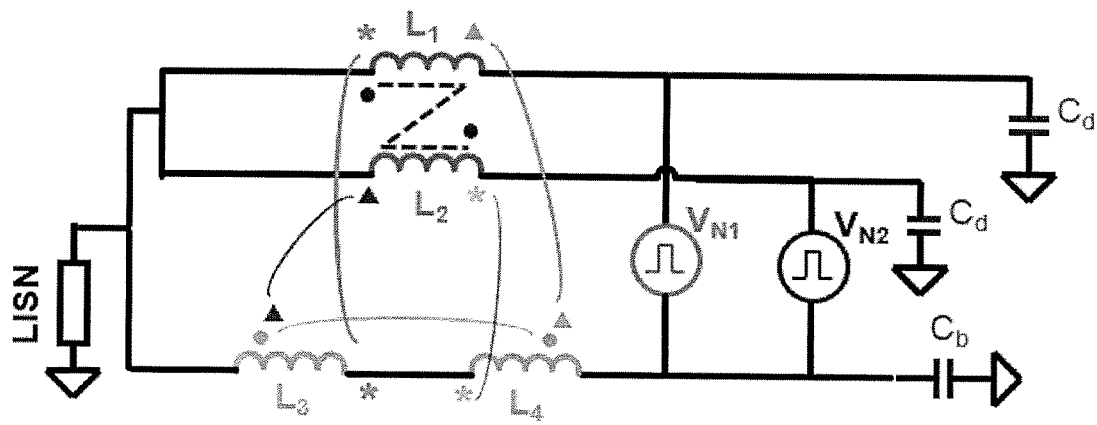
Figure 10B:
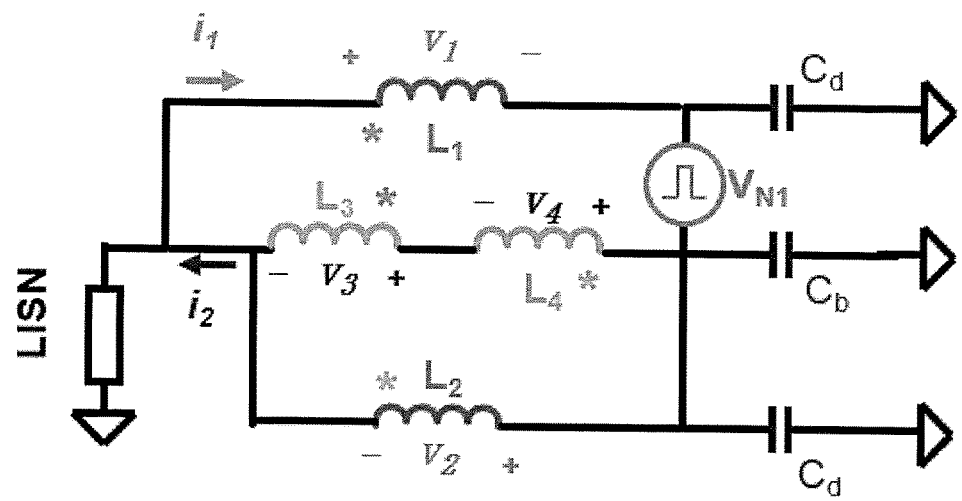

At high frequencies where the currents in the parasitic capacitances are larger, better balance can be obtained if the balance inductor $L_b$ is coupled with the original inductor $L_1$. Thus, for the coupled inductors $L_1$ and $L_2$, two balance inductors, $L_3$ and $L_4$, are applied as shown in FIG. 9A. The coupling of the inductors to and between the balance inductors is illustrated by curved lines in FIGS. 9A and 10A. A suitable magnetic structure to provide the coupling of the inductors is shown in FIG. 9B. The CM noise model is schematically illustrated in FIG. 10A and, as before, the effect of either noise voltage source, alone, is modeled in FIG. 10B. The balance condition for the circuit of FIG. 10B is:

$$Z_d/Z_b = (C_a+C_b)/C_d. \quad (8)$$

As in the above analysis, $Z_d/Z_b$ must be calculated first. It is assumed that $L_1$ and $L_3$ are perfectly coupled as are $L_2$ and $L_4$ and that the number of turns of $L_1$ and $L_2$ is $N_1$ and the number of turns of $L_3$ and $L_4$ is $N_2$. Thus, for a balanced condition of $V_{N1}$:

$$V_1/V_3 = N_1/N_2,$$

$$V_2/V_4 = -N_1/N_2,$$

$$V_3V_4 = V_2, \text{ and}$$

$$i_1 = i_2 \quad (9)$$

from which the ratio of $Z_d/Z_b$ can be derived as:

$$Z_d/Z_b = (V_1/i_1)/(V_2/i_2) = (N_1+N_2)/N_2. \quad (10)$$

Thus, the balance condition is:

$$N_1/N_2 = C_b/C_d \quad (11)$$

which is also the balance condition for $V_{N2}$. As long as this balance is achieved, CM noise is minimized in the totem-pole PFC converter.

Figure 11:
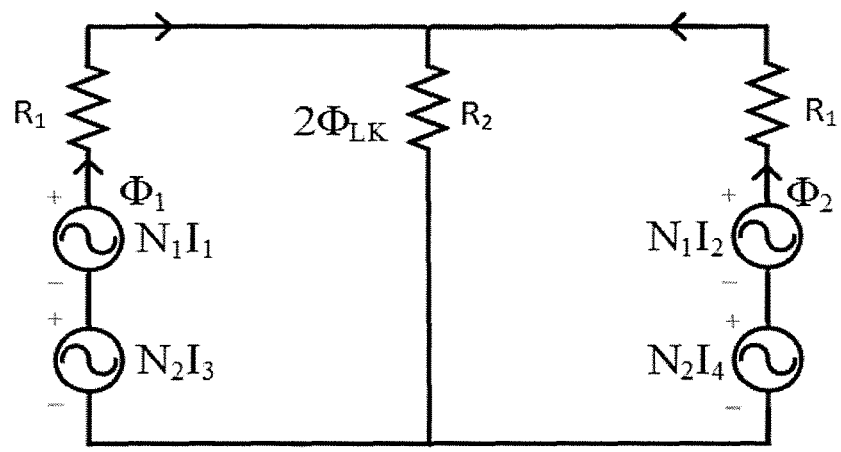
FIG. 11 is a schematic diagram of a model of the magnetic circuit of FIG. 9B.
Figure 12:
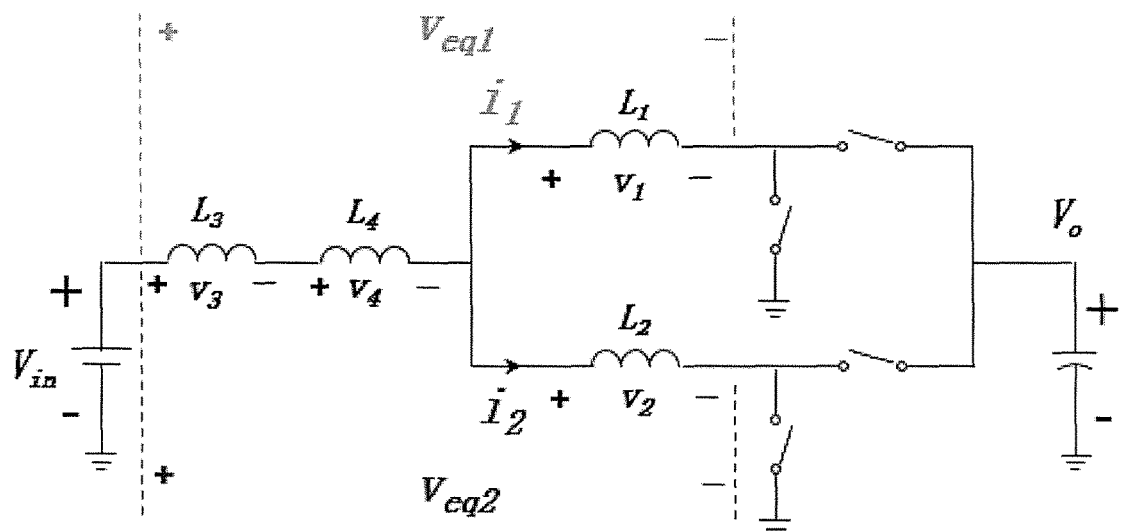
FIG. 12 is an equivalent circuit of the model of FIG. 11, FIGS. 13A and 13B illustrate unbalanced and balanced waveforms of a simulation of the operation of the circuit of FIG. 10A, respectively.

It will be recalled from the above analysis of the performance of the inverse coupled inductor circuit of FIG. 2, that the equivalent inductances $L_{eq1}$–$L_{eq4}$ were derived from the two coupled inductor circuit structure. In the case of the circuit of FIG. 10A, there are four inductors coupled together. The equivalent inductances for the four coupled inductor structure can be similarly derived by modeling the magnetic circuit as shown in FIG. 11. The equivalent circuit is shown in FIG. 12. From the magnetic circuit of FIG. 11, the inductance matrix can be derived as:

$$\begin{bmatrix} v_1 \\ v_2 \\ v_3 \\ v_4 \end{bmatrix} = L1 \begin{bmatrix} 1 & \alpha & \frac{N_2}{N_1} & \alpha\frac{N_2}{N_1} \\ \alpha & 1 & \alpha\frac{N_2}{N_1} & \frac{N_2}{N_1} \\ \frac{N_2}{N_1} & \alpha\frac{N_2}{N_1} & \frac{N_2^2}{N_1^2} & \alpha\frac{N_2^2}{N_1^2} \\ \alpha\frac{N_2}{N_1} & \frac{N_2}{N_1} & \alpha\frac{N_2^2}{N_1^2} & \frac{N_2^2}{N_1^2} \end{bmatrix} \begin{bmatrix} di_1/dt \\ di_2/dt \\ di_3/dt \\ di_4/dt \end{bmatrix} \quad (12)$$

From the equivalent circuit of FIG. 12, the equations for $V_{eq1}$ and $V_{eq2}$ can be derived as $$\begin{cases} v_{eq1} = v_1 + v_3 + v_4 \\ v_{eq2} = v_2 + v_3 + v_4 \end{cases} \quad (13)$$

From equations (12) and (13), $V_{eq1}$ and $V_{eq2}$ can be expressed as $$\begin{cases} v_{eq1} = L1\left(\frac{N_1^2 + 2(1+\alpha)N_1N_2 + 2(1+\alpha)N_2^2}{N_1^2}\right) \cdot \frac{di_1}{dt} + \\ \quad L1\left(\frac{\alpha N_1^2 + 2(1+\alpha)N_1N_2 + 2(1+\alpha)N_2^2}{N_1^2}\right) \cdot \frac{di_2}{dt} \\ v_{eq2} = L1\left(\frac{N_1^2 + 2(1+\alpha)N_1N_2 + 2(1+\alpha)N_2^2}{N_1^2}\right) \cdot \frac{di_2}{dt} + \\ \quad L1\left(\frac{\alpha N_1^2 + 2(1+\alpha)N_1N_2 + 2(1+\alpha)N_2^2}{N_1^2}\right) \cdot \frac{di_1}{dt} \end{cases} \quad (14)$$

Figures 13A, 13B:
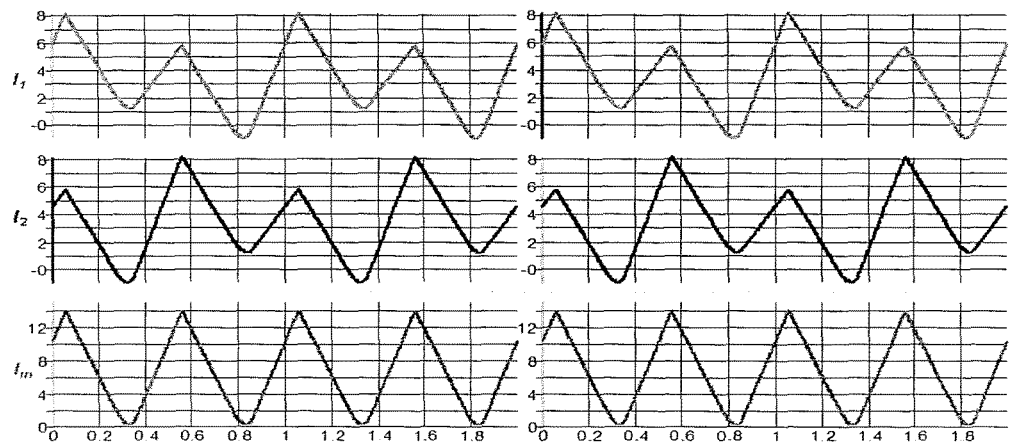
Figure 14:
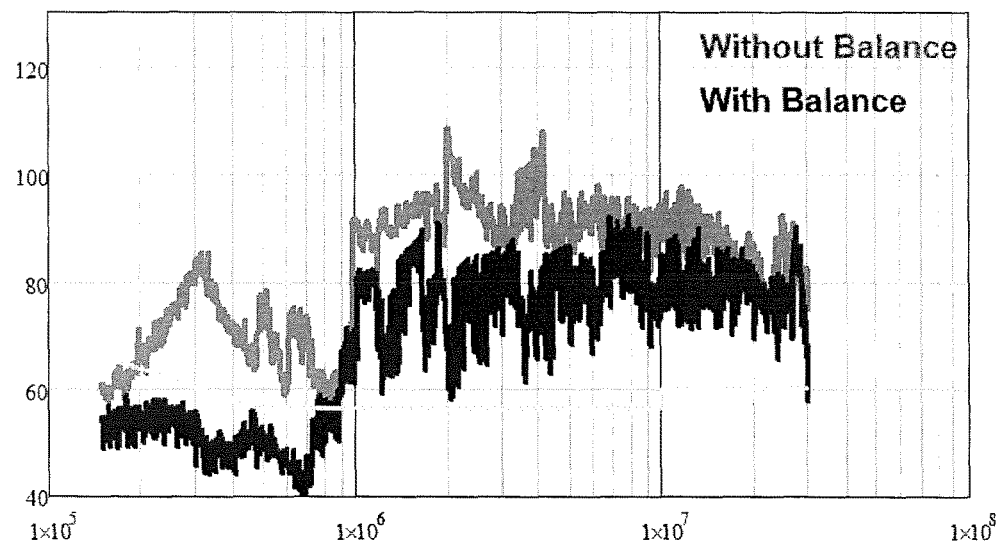
FIG. 14 is a graphic illustration of the CM noise reduction achieved by the invention.

If it is assumed that $$L_{eq} = L1\left(\frac{N_1^2 + 2(1+\alpha)N_1N_2 + 2(1+\alpha)N_2^2}{N_1^2}\right) \quad (15)$$

$$M_{eq} = L1\left(\frac{\alpha N_1^2 + 2(1+\alpha)N_1N_2 + 2(1+\alpha)N_2^2}{N_1^2}\right)$$

the four inductor circuit of FIG. 10 can be simplified as the two inductor structure of FIG. 2 in which the self-inductance is $L_{eq}$ and the mutual inductance is $M_{eq}$. To verify the validity of this assumption, a circuit was simulated in which $L_{eq}$ and $M_{eq}$ of the four inductor balanced circuit were made equal to L and M of the two inductor unbalanced circuit, respectively. The waveforms of the simulation of the balanced and non-balanced circuits are identical as shown in FIGS. 13A and 13B, respectively. A comparison of the simulated CM noise in the balanced and non-balanced circuits is shown in FIG. 14 from which it is seen that balancing the inverse coupled inductors as discussed above provides a 30 db reduction in CM noise.

To achieve volume reduction in power converters to achieve an increase in power density forming windings in multi-layer printed circuit boards (PCBs) has been investigated and found to facilitate control of parasitic capacitances. However, some increase in loss of efficiency has been observed and the acceptability of PCB windings is largely a matter of whether economic advantage of fabrication and material cost of such structures makes the loss of efficiency tolerable and whether or not particular PCB structure can be found that sufficiently limit such losses in efficiency. To evaluate possible PCB structures, non-coupled inductors suitable for a 1 KW converter were constructed using two ER23 with ten turn windings of 250-46 Litz wire. A breakdown of observed losses is shown in Table 1 which provides a baseline of inductor size and loss for comparison with several possible PCB winding structures.

TABLE 1

| DC Winding loss (W) | AC Winding loss (W) | Core loss (W) | Total loss (W) |
|---|---|---|---|
| 0.7 | 1.6 | 2.3 | 4.6 |

Figure 15:
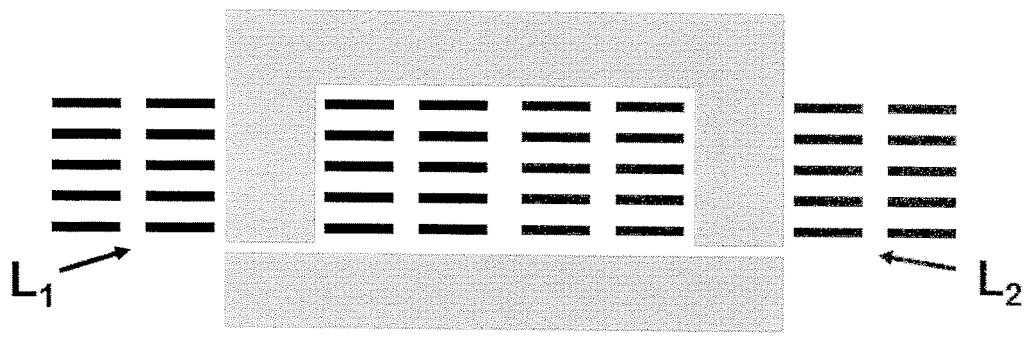
FIG. 15 is a schematic diagram of a PCB coupled inductor structure using a UI core.

A first PCB winding structure suitable for practice of the invention is schematically shown in cross-section in FIG. 15 using a UI core. This structure uses only the two inductors as in the non-balanced embodiment of FIG. 2. To reduce the average switching frequency as much as possible a large coupling coefficient of α=−0.7 was chosen. However, since a typical EI core cannot support such a high coupling factor with separate PCB-type windings, a UI core was used for this structure.

TABLE 2

| DC Winding loss (W) | AC Winding loss (W) | Core loss (W) | Total loss (W) |
|---|---|---|---|
| 0.5 | 6.2 | 1.3 | 8.0 |

It can be seen that this coupled inductor structure has a high AC winding loss and much increased total loss compared with the non-coupled inductors even though DC and core losses are reduced. The increased AC loss is due to eddy currents in the PCB winding.

Figure 16:
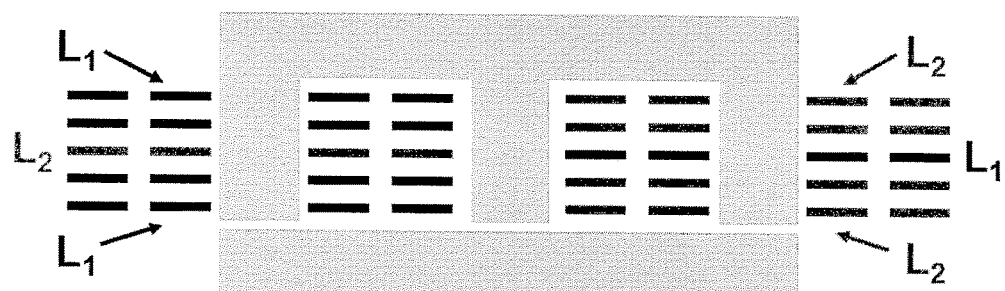
FIGS. 16 and 17 are a schematic PCB coupled inductor structure with interleaving on an EI core and a simulation of magnetic flux in the left leg of FIG. 16, respectively.

To reduce the AC winding loss a second embodiment of a PCB coupled inductor structure is schematically illustrated in FIG. 16. This structure is formed on an EI core and includes two turns of each winding interleaved in the winding layers of the other winding. The interleaving of turns of respective windings on an EI-type core raises the coupling factor to be the same as the UI-type core of the previously described embodiment. Table 3 contains a breakdown of the losses for this coupled inductor structure.

TABLE 3

| DC Winding loss (W) | AC Winding loss (W) | Core loss (W) | Total loss (W) |
|---|---|---|---|
| 0.5 | 2.6 | 1.9 | 5.0 |

Figure 17:
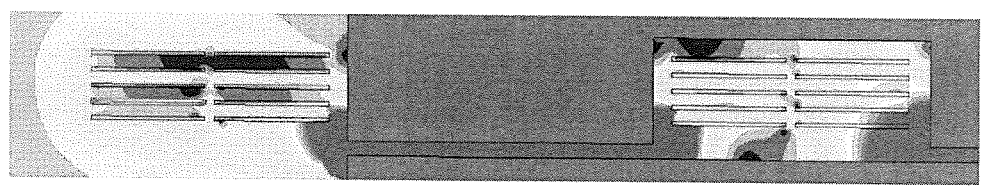

With this interleaved PCB winding structure, AC winding loss was greatly reduced but the total loss is still significantly higher than the non-coupled structure. FIG. 17 shows results of a finite element analysis (FEA) simulation which reveals a strong fringing flux (as dark regions) near the air gap between the two parts of the EI core.

Figure 18:
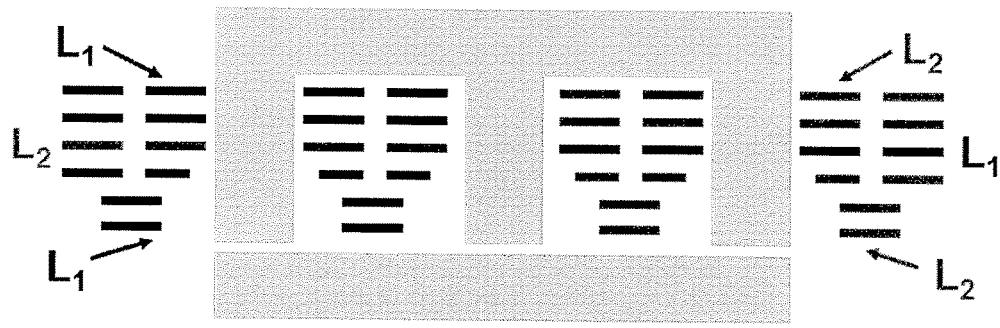
FIGS. 18 and 19 are a schematic variant PCB coupled inductor structure with interleaving on an EI core and a simulation of magnetic flux in the left leg of FIG. 18, respectively.
Figure 19:
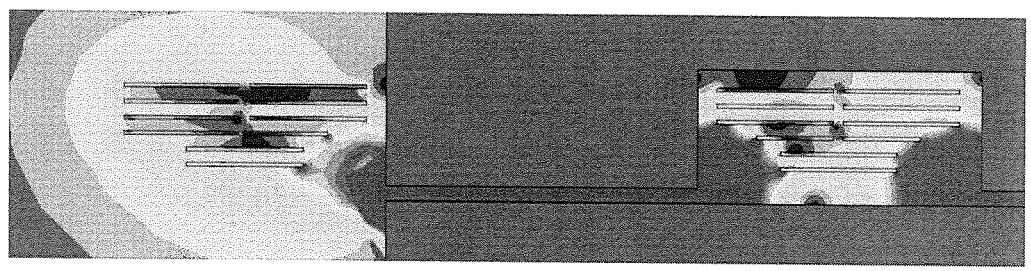

Fringing flux can be reduced by cutting the winding near the air gap and spacing the cut parts of the winding in different layers at an increased distance from the air gap. The layers of the respective windings remain interleaved as in the second embodiment. The resulting third PCB winding structure embodiment is schematically illustrated in FIG. 18 and results of the FEA flux simulation is shown in FIG. 19 The loss breakdown for this embodiment is shown in Table 4.

TABLE 4

| DC Winding loss (W) | AC Winding loss (W) | Core loss (W) | Total loss (W) |
|---|---|---|---|
| 0.5 | 1.9 | 1.9 | 4.3 |

It is seen that the fringing flux is avoided and the total losses are somewhat less than for the non-coupled inductors. Accordingly, this structure is much preferred for practice of the invention without balancing.

Figure 20:
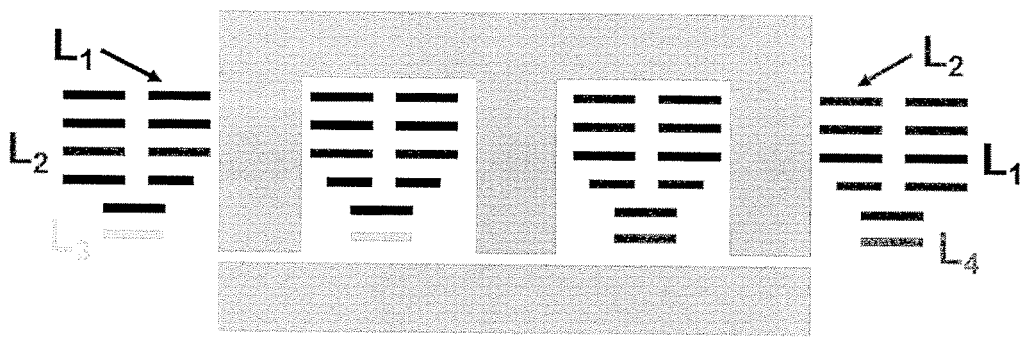
FIG. 20 is a schematic PCB coupled inductor structure with interleaving on an EI core similar to FIG. 18 but including balancing windings.

A fourth embodiment of a PCB winding structure is schematically illustrated in FIG. 20 which provides third and fourth inductor windings for achieving balancing and reduction of CM noise. This structure is essentially the same as that of FIG. 18 except that the bottom PCB winding layer forms the third and fourth balancing inductors. The loss breakdown for this fourth embodiment is shown in Table 5.

TABLE 5

| DC Winding loss (W) | AC Winding loss (W) | Core loss (W) | Total loss (W) |
|---|---|---|---|
| 0.6 | 2.1 | 1.9 | 4.6 |

The total losses are the same as for the baseline non-coupled inductors and only slightly higher than the total losses of the embodiment of FIG. 18. Therefore, this embodiment of the invention can provide substantial reduction in CM noise through balancing with little penalty in efficiency compared to the coupled but non-balanced embodiment of FIG. 18 while allowing higher nominal switching frequency while minimizing losses due to oscillation and non-ZVS losses of a non-coupled inductor totem-pole PFC converter and achieving substantial potential increase in power density and reduction of manufacturing costs as compared with non-coupled inductors or inductors formed with wire windings as well as facilitating control of parasitic capacitances.

Such numerous meritorious effects of the invention imply a wide range of applicability and design variation. For example, the increasing popularity of electrically powered vehicles could benefit greatly from application of the principle of the invention as described above. Electrically powered vehicles which are currently commercially available have on-board battery chargers that are independent of arrangements for controlling propulsion of the vehicle and are thus unidirectional. These chargers generally operate at a low switching frequency of less than 100 kHz and have a low power density of 3 to 12 Watts/in$^3$ with an efficiency of about 92%-94%. However, bidirectional power converters could save substantial weight and cost and potentially increase efficiency and power density since they can be operated to control vehicle motion and avoid additional power control circuitry to do so.

Figure 21:
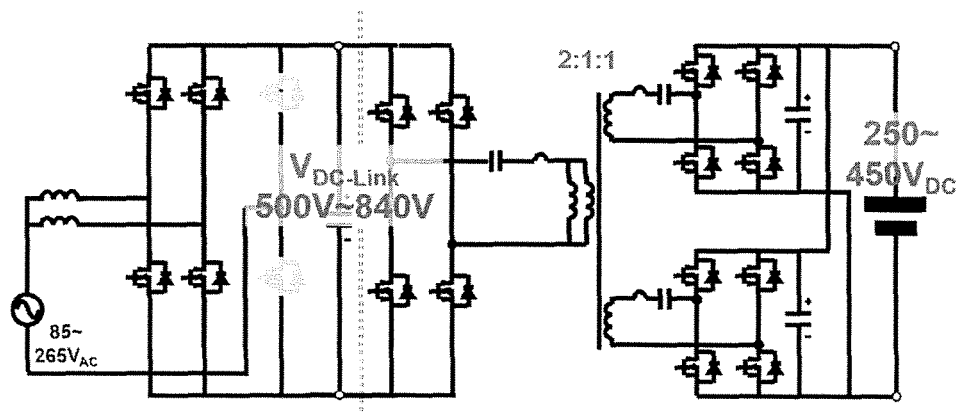
FIG. 21 is a schematic diagram of a proposed 6.6 kW bi-directional on-board charger for the battery of an electric vehicle.

Referring now to FIG. 21 a structure employing the principles of the invention described above to achieve such improvements over existing battery chargers is illustrated. In this two-stage structure, the first stage is a two-phase interleaved totem-pole PFC converter similar to that described above and identical to the circuit of FIG. 2 except for using direct or positive coupling of inductors rather than inverse coupling. but using 1200V SiC devices as switches to form a converter capable of delivering 6.5 KW. The first stage output includes a filter capacitor and is referred to as a DC link. The second stage is two CLLC resonant converters connected in parallel. A switching bridge is provided to obtain AC waveforms from the voltage on the DC link so that power can be coupled to the second stage through a transformer. The battery voltage range in electrically powered vehicles is generally very wide from 259V to 450V. In order to have the CLLC converter operating at an optimum point the DC link voltage is also designed to have a very wide and high range of 500V to 840V using inductor coupling that can be either inverse as described above or direct to reduce operating frequency and frequency range and input current ripple. The switching frequency of this embodiment is designed to be 300 kHz and CRM is employed to reduce the high turn-on losses of SiC devices. The symmetry of the switches in the totem-pole, bridge and resonant converter stages allow power to be transferred in a controlled manner in either direction through the converter.

Figure 22:
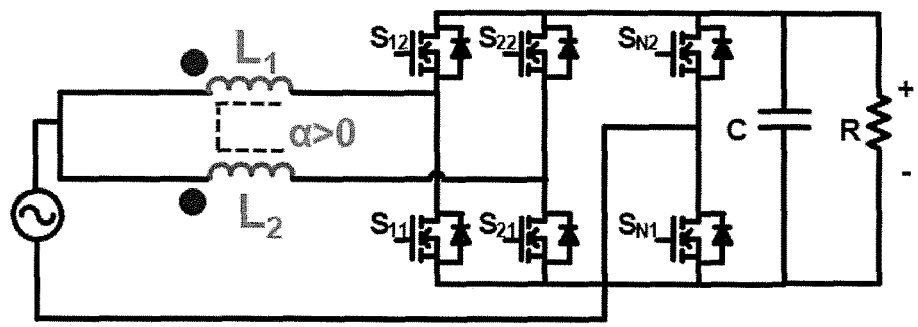
FIG. 22 is a schematic diagram of a PFC converter having a direct or positive coupled inductor.
Figure 23:
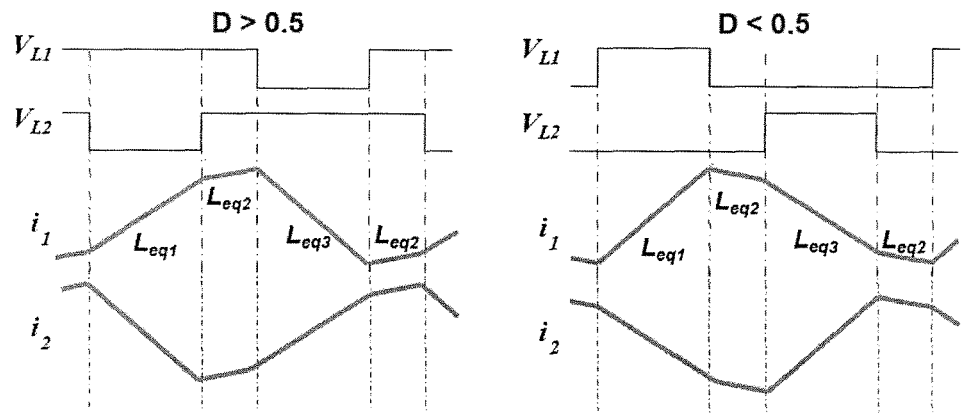
FIG. 23 illustrates waveforms of the direct or positive coupled inductor of FIG. 22.
Figure 24:
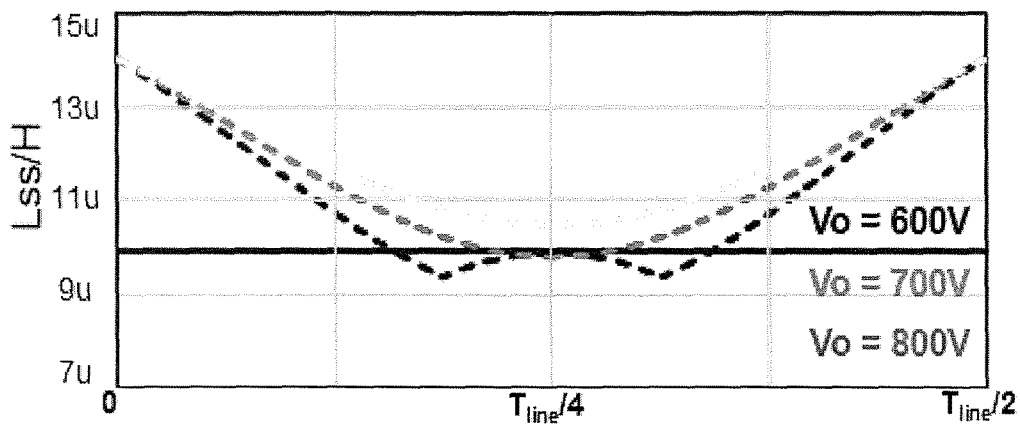
FIG. 24 illustrates variation in steady state inductance over a half line cycle for different output voltages.
Figure 25:
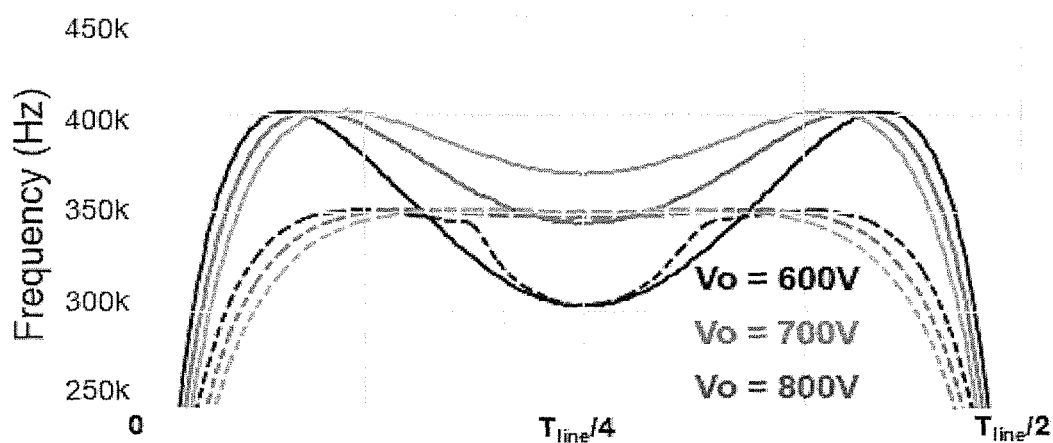
FIG. 25 illustrates switching frequency variation during a half line cycle for the PFC converter of FIG. 22.

Positive inductor coupling can also be advantageously employed in some applications of the invention including the battery charger for electric vehicles described above that require relatively higher output voltages. Positive inductor coupling also provides reduced input ripple and allows lower and more consistent frequency to be achieved. A totem-pole PFC converter having positive inductor coupling is shown in FIG. 22. FIG. 23 shows typical inductor current waveforms for this positive inductor coupled embodiment which exhibit three equivalent inductances which are the same as for the inversely coupled embodiments discussed above. Under some circumstances only two or even only one equivalent inductance(s) will be presented but the equivalent inductances will differ from the inductance in each respective phase and the invention will remain operative to change inductor current slope and reduce switching frequency and attendant losses. FIG. 24 illustrates the change in steady-state inductance during a half line cycle time for different output (e.g. DC link voltages compared with the constant inductance for non-coupled inductors. It can be seen that the inductance of the positive coupled inductors is unconditionally larger than that of a non-coupled inductor designed to have the same inductance. FIG. 25 shows the variation is switching frequency over a half line cycle as compared with the non-coupled inductors (solid line). With the higher steady state inductance of the positive coupled inductors the switching frequency is reduced and is more nearly constant for higher output voltages of 700V-800V. Therefore, positive inductor coupling can reduce switching frequency variation range and switching losses.

Figure 26:
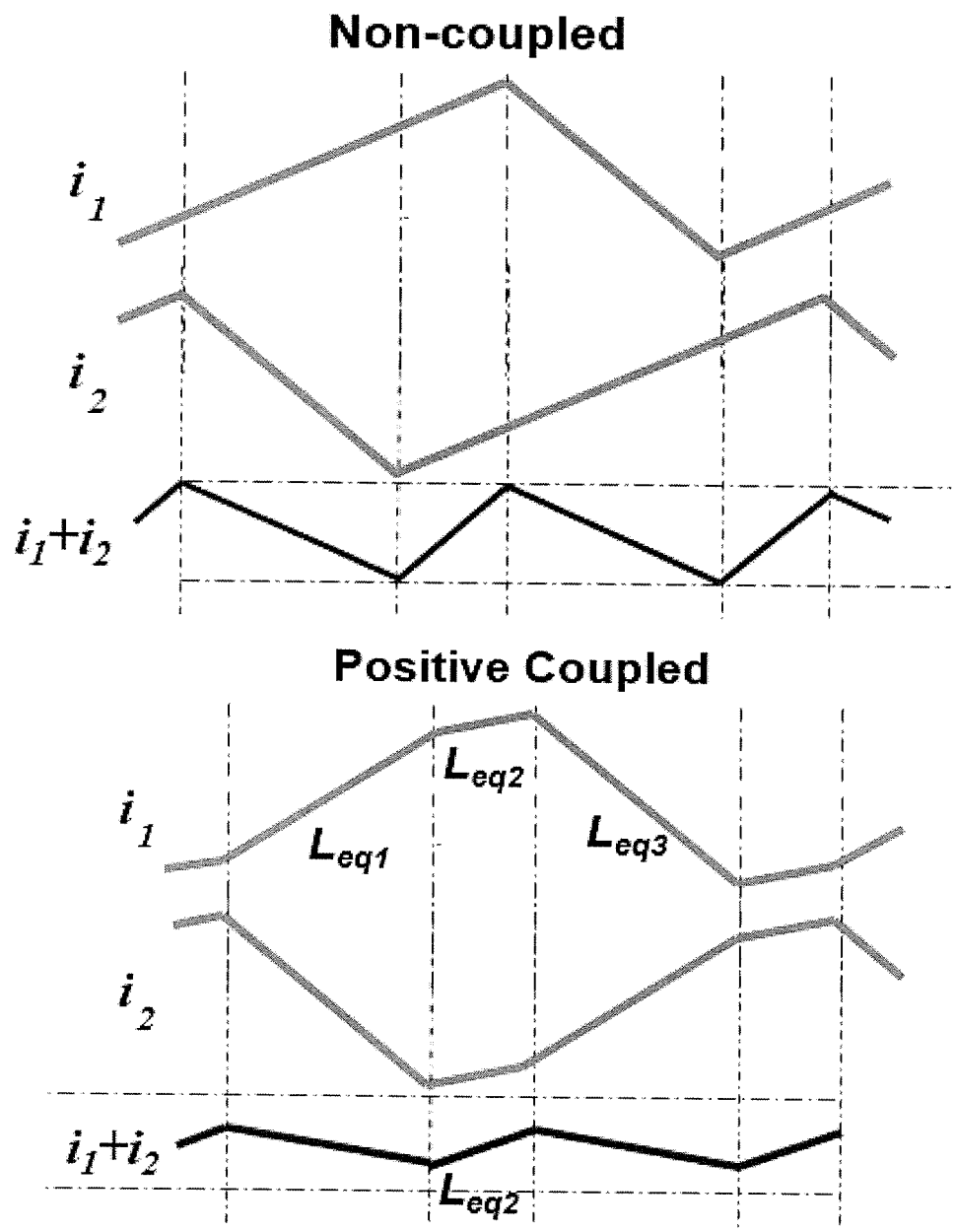
FIG. 26 illustrates an input current waveform comparison between direct or positive coupled inductor and non-coupled inductors.
Figure 27:
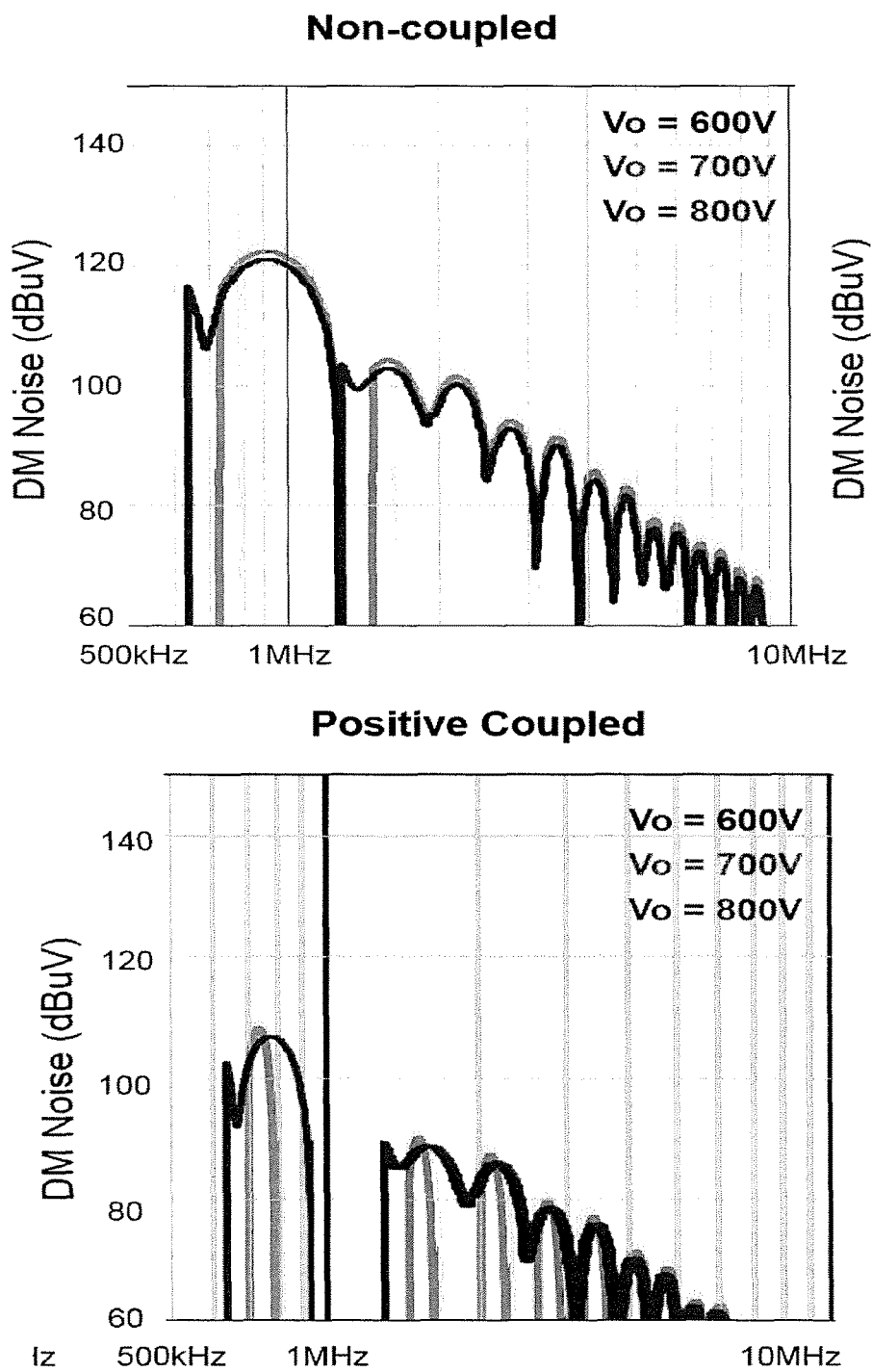
FIG. 27 illustrates an input current DM noise comparison between direct or positive coupled inductor and non-coupled inductors.

Another benefit of positive inductor coupling is a potential reduction in DM noise That is, in a two-phase structure the DM noise is more dependent on input current; the sum of $i_1$ and $i_2$, as compared with the non-coupled inductor converter in FIG. 26. The input current ripple is determined by $L_{eq2}$ which is necessarily larger than the non-coupled inductance L and produces a smaller current ripple and smaller DM noise as shown in the comparison provided in FIG. 27. CM noise is inherently small due to the reduced current ripple. Therefore the DM filter corner frequency can be raised from 19 kHz to 35 kHz with consequent substantial reduction in filter size.

Figure 28:
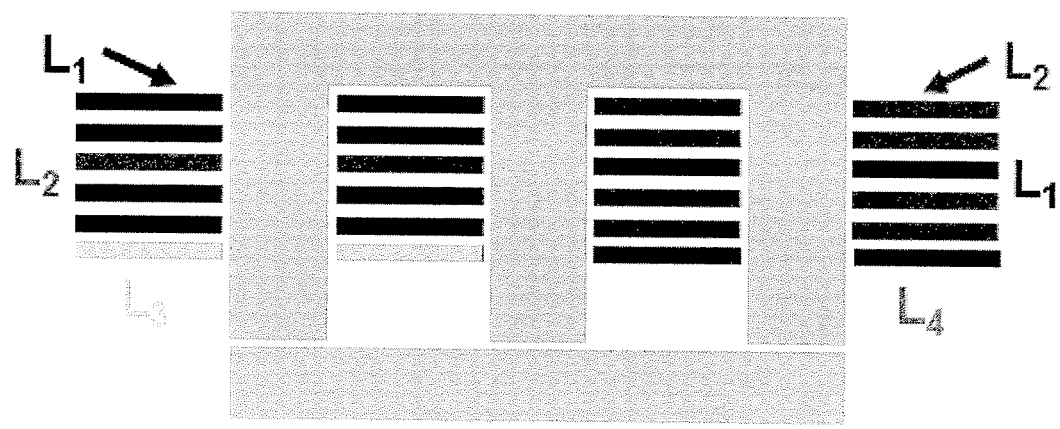
FIG. 28 is a schematic illustration of a PCB direct or positive coupled inductor with balance.

Balancing can also be applied to the positive coupled inductor embodiments and suitable coupled inductors can be built using PCB windings as shown in FIG. 28. Table 6 provides a comparison of losses of the interleaved PCB winding with a Litz wire wound embodiment suitable for a 6 KW converter such as in the electric vehicle battery charger described above. While there is a significant increase of total losses, the PCB winding embodiment is susceptible of automatic manufacture at reduced cost; in view of which, the increased losses are very acceptable.

TABLE 6

|  | Winding loss (W) | Core Loss (W) | Total Loss (W) |
|---|---|---|---|
| Interleaved PCB winding | 19 | 17 | 36 |
| non-coupled Litz Wire inductor | 12 | 13 | 25 |

CM and DM noise are also reduced with the PCB winding structure due to the PCB structure facilitating control of parasitic capacitances Balancing for DM and CM noise reduction is unnecessary in many applications for which positive inductor coupling would be advantageous.

In view of the foregoing, it is seen that the invention provides an interleaved multiphase PFC power converter capable of reducing non-ZVS losses and reducing average switching frequency over a half line cycle below a nominal switching frequency which may thus be increased to simplify and reduce size, weight and cost of EMI filtering. These meritorious effects are achieved through positive or inverse coupling of inductors of the respective phases that presents at least three different equivalent inductances during different portions of a switching cycle and which can be balanced to substantially reduce DM and CM noise. The coupled inductor structure can be constructed with printed circuit board coils and can be automatically manufactured with very little loss of efficiency compared with wire windings and facilitation of control of parasitic capacitances. The basic principles of the invention can be applied to power converters of any number of phases and are appropriate to many applications such as bidirectional power converters for battery charging and control of propulsion power in electrically powered vehicles or local power generation arrangements such as wind turbines.

While the invention has been described in terms of a single preferred embodiment, those skilled in the art will recognize that the invention can be practiced with modification within the spirit and scope of the appended claims.

The invention claimed is:

1. A power converter including a plurality of switches wherein said switches are controlled in a manner to provide a switching cycle, and an inductor structure including at least two inductors wherein said at least two inductors are magnetically coupled with each other to present one or more equivalent inductance values which vary during different portions of a switching cycle and differing from an inductance value of respective ones of said at least two inductors, said at least two inductors being connected in series with said plurality of switches during said switching cycle and wherein respective windings of each of said at least two inductors are placed on outer legs of a core, said at least two inductors being formed of printed circuit board layers, said printed circuit board layers being interleaved to provide at least one layer of each winding between said printed circuit board layers of another winding of said at least two inductors, wherein a board layer configuration of one leg is opposite that of another leg.

2. The power converter as recited in claim 1, wherein said power converter has a multiphase totem-pole topology.

3. The power converter as recited in claim 2, wherein said power converter is a two-phase power converter.

4. The power converter as recited in claim 1, wherein at least one said winding of at least one said printed circuit board layer is split to form at least two turns of said winding.

5. The power converter as recited in claim 1, wherein at least one said layer of said at least one printed circuit board layer forms a single turn of at least one said winding, said winding being spaced from a core by a distance greater than a spacing of a winding that is split to form at least two turns.

6. The power converter as recited in claim 1, wherein at least two of said layers of said at least one inductor form a single turn of at least two said windings, said two windings being separate windings and spaced from a core by a distance greater than a spacing of a winding that is split to form at least two turns.

7. The power converter as recited in claim 1 wherein said at least two inductors are formed on an EI-shaped core.

8. The power converter as recited in claim 1, wherein said at least two said inductors are positively coupled.

9. The power converter as recited in claim 1, wherein said at least two inductors are inversely coupled.

10. The power converter as recited in claim 1, wherein said switches are operated for power factor correction at a nominal switching frequency of at least 1 MHZ at a midpoint of a half line cycle.

11. The power converter as recited in claim 1, wherein said at least two inductors include at least two additional inductors coupled to said at least two inductors for balancing parasitic capacitances of said inductor structure.

12. An inductor structure including at least two inductors wherein said at least two inductors are magnetically coupled with each other to present one or more equivalent inductance values which vary during different portions of a switching cycle and are different from a value of either of said at least two inductors and wherein respective windings of each of said at least two inductors are placed on outer legs of a core, said at least two inductors being formed of printed circuit board layers, said printed circuit board layers being interleaved to provide at least one layer of each winding between said printed circuit board layers of another of said at least two windings inductors, wherein a board layer configuration of one leg is opposite that of another leg.

13. The inductor structure as recited in claim 12, wherein at least one said winding of at least one said printed circuit board layer is split to form at least two turns of at least one said winding.

14. The inductor structure as recited in claim 12, wherein at least one said layer of said at least one printed circuit board layer forms a single turn of at least one said winding, said single turn being spaced from a core by a distance greater than a spacing of a winding that is split to form at least two turns.

15. The inductor structure as recited in claim 12, wherein at least two of said layers of said at least one printed circuit board layer forms a single turn of at least two said windings, said two windings being separate windings and spaced from a core by a distance greater than a spacing of a winding that is split to form at least two turns.

16. The inductor structure as recited in claim 12, wherein said at least two inductors are formed on a UI-shaped core.

17. The inductor structure as recited in claim 12, wherein said at least two inductors are formed on an EI-shaped core.

18. The inductor structure as recited in claim 12, wherein said at least two inductors are positively coupled.

19. The inductor structure as recited in claim 12, wherein said at least two inductors are inversely coupled.

20. The inductor structure as recited in claim 12, wherein said at least two inductors include at least two additional inductors coupled to said at least two inductors for balancing parasitic capacitances of said inductor structure.

* * * * *